US009621207B2

(12) United States Patent
Welnick et al.

(10) Patent No.: US 9,621,207 B2
(45) Date of Patent: Apr. 11, 2017

(54) METHODS AND APPARATUS FOR DETECTING PRESENCE OF A JAMMING SIGNAL

(75) Inventors: William E. Welnick, Poway, CA (US); William P. Alberth, Jr., Prairie Grove, IL (US); Daniel J. Declerck, Lake Barrington, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 318 days.

(21) Appl. No.: 13/567,219

(22) Filed: Aug. 6, 2012

(65) Prior Publication Data

US 2014/0038536 A1 Feb. 6, 2014

(51) Int. Cl.
*H04B 1/10* (2006.01)
(52) U.S. Cl.
CPC .................................. *H04B 1/1027* (2013.01)
(58) Field of Classification Search
CPC ....................................................... H04K 1/00
See application file for complete search history.

(56) References Cited

U.S. PATENT DOCUMENTS

| | | | | |
|---|---|---|---|---|
| 6,714,605 | B2 * | 3/2004 | Sugar et al. | 375/340 |
| 6,850,735 | B2 | 2/2005 | Sugar et al. | |
| 7,142,108 | B2 | 11/2006 | Diener et al. | |
| 7,525,942 | B2 * | 4/2009 | Cordone | 370/335 |
| 7,529,553 | B2 * | 5/2009 | Koyanagi | 455/457 |
| RE41,382 | E * | 6/2010 | Yee et al. | 342/357.23 |
| 7,873,337 | B2 * | 1/2011 | Petro | 455/154.1 |
| 7,986,922 | B2 | 7/2011 | Glazko et al. | |
| 8,055,204 | B2 * | 11/2011 | Livsics et al. | 455/67.11 |
| 8,442,516 | B2 * | 5/2013 | Swaminathan et al. | 455/423 |
| 2003/0153290 | A1 * | 8/2003 | Sako | 455/150.1 |
| 2003/0224741 | A1 * | 12/2003 | Sugar et al. | 455/115.1 |
| 2005/0095986 | A1 * | 5/2005 | Hassan | H04W 16/14 455/67.13 |
| 2006/0152408 | A1 * | 7/2006 | Leinonen | G01S 19/21 342/357.59 |
| 2007/0224963 | A1 * | 9/2007 | Moscovitz et al. | 455/296 |
| 2009/0047920 | A1 * | 2/2009 | Livsics et al. | 455/226.1 |
| 2010/0248667 | A1 * | 9/2010 | Daugherty et al. | 455/226.1 |
| 2011/0090939 | A1 * | 4/2011 | Diener et al. | 375/136 |

\* cited by examiner

*Primary Examiner* — Wesley Kim
*Assistant Examiner* — Dong-Chang Shiue
(74) *Attorney, Agent, or Firm* — Faegre Baker Daniels LLP

(57) ABSTRACT

A communication device performs a method for detecting presence of a jamming signal. The method includes retrieving a scan list comprising multiple radio channels within a first frequency range of operation of the communication device. The method further includes scanning at least a subset of the channels on the scan list to determine, for each scanned channel, whether energy that exceeds an energy threshold is detected on the scanned channel. Moreover, the method includes determining a first quantitative measure based on a first plurality scanned channels having energy that exceeds the energy threshold, and comparing the first quantitative measure to at least a first jamming signal detection threshold. Additionally, the method includes indicating, on the communication device, presence of a jamming signal when the first quantitative measure satisfies the at least a first jamming signal detection threshold.

21 Claims, 9 Drawing Sheets

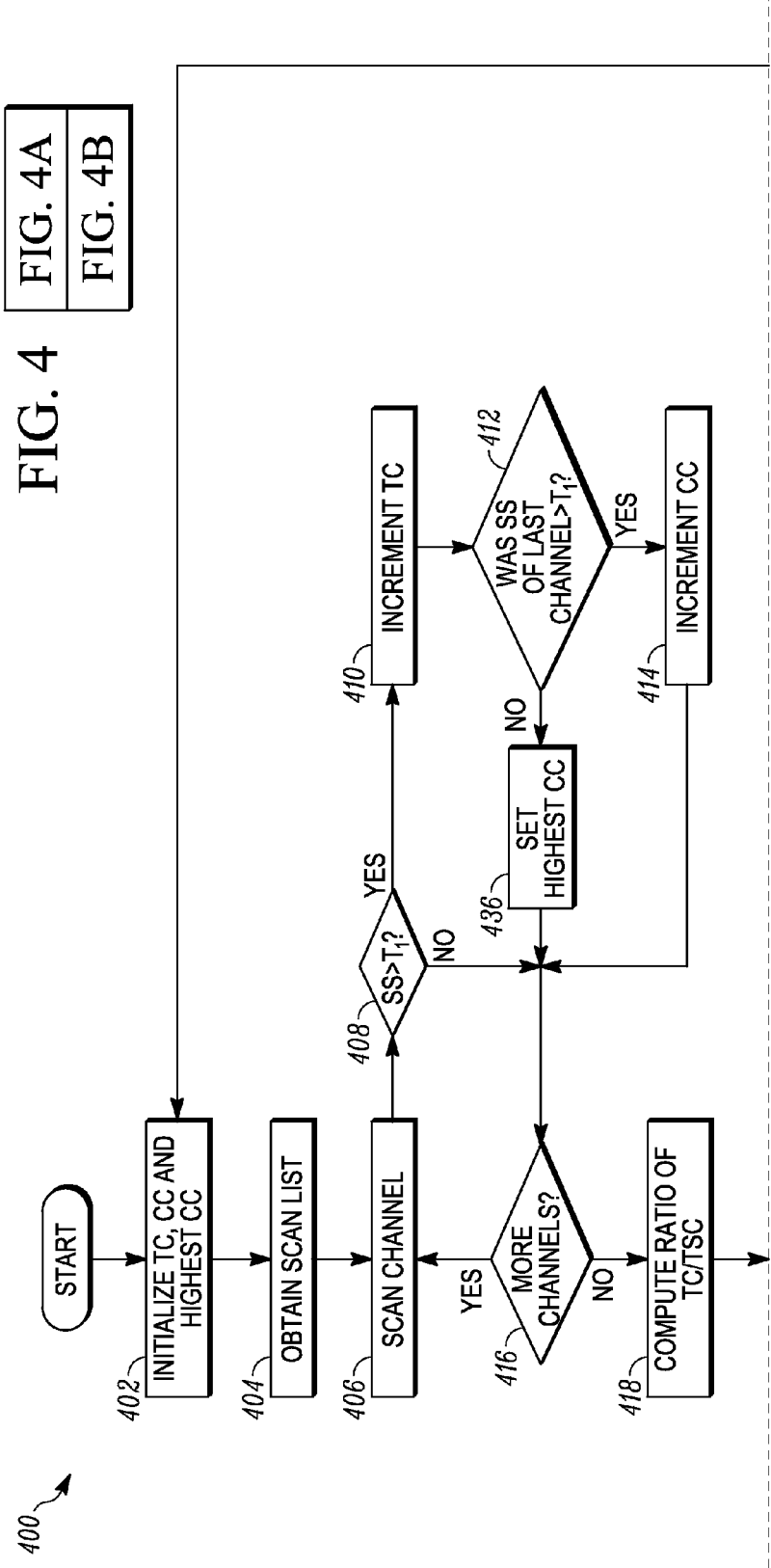

800

| CHANNELS | BAND | MODE | |
|---|---|---|---|
| EVERY 3rd CHANNEL | CELL | CDMA | 802 |
| EVERY 3rd CHANNEL | PCS | CDMA | 804 |
| ALL CHANNELS | PCS | GSM | 806 |
| ALL CHANNELS | 700 MHz | LTE | 808 |

810 — CHANNELS, 812 — BAND, 814 — MODE

FIG. 8

METHODS AND APPARATUS FOR DETECTING PRESENCE OF A JAMMING SIGNAL

FIELD OF THE DISCLOSURE

The present disclosure relates generally to wireless communications and, in particular, to methods and apparatus for detecting the presence of a jamming signal.

BACKGROUND

Wireless communication signals sent between wireless communication devices or between a wireless communication device and the communication infrastructure are susceptible to jamming signals. More particularly, a desired signal, or signal of interest, is a signal that conveys information, such as audio, video, text or other media or control information between two or more devices over a physical transmission medium. A jamming signal is any signal that disrupts or interferes with the reception of a desired signal by, for instance, decreasing a signal-to-noise ratio for the desired signal.

Typically, the jamming signal transmission occupies the same frequency and has the same modulation type as the desired signal, and the jamming signal has enough signal power to impede or altogether block reception of the desired signal. The signal-to-noise ratio measures a signal level (also referred to herein as "signal power" or "signal strength") of a desired signal as compared to the signal level of noise or any other undesired signal. Where signal-to-noise ratio is low (such as less than one), a receiving device of desired signals is less likely to be able to discern the desired signals from undesired signals. Accordingly, desired signals are not properly received and processed by the receiving device, and the wireless communication with the receiving device is thus disrupted or even disabled.

A device that generates or transmits jamming signals is termed, herein, as a jammer or jamming device. For example, a radio jamming device disrupts a wireless communication by transmitting radio frequency signals (also referred to herein simply as "radio signals" or "signals") in the same radio frequencies (also referred to herein simply as "frequencies") being used by wireless communication devices transmitting desired signals. Radio signals are carried over radio waves that have frequencies (i.e., rates of oscillation), within the radio spectrum, ranging from hundreds of gigahertz to as low as a few hertz. The entire spectrum of radio frequencies is divided into multiple smaller frequency ranges, known in the art as radio frequency bands (frequency bands or bands for short). Oftentimes, each frequency band is further divided or allocated into multiple radio channels (also referred to herein as "channels"). A channel is, accordingly, defined herein as a portion of a frequency band within the electromagnetic spectrum (for example within the radio spectrum) that is allocated and used to carry desired signals and is often characterized at least by a receive or transmit frequency and a capacity, which is often measured by the channel's bandwidth (e.g., in Hz) and/or data rate (e.g., in bits per second). As used herein, bandwidth is the difference between upper and lower frequencies in a continuous set of frequencies, and data rate is the maximum rate at which information can be passed over the channel.

Radio jamming devices are known to transmit a jamming signal over a single radio channel (meaning the jamming signal is transmitted using just the bandwidth of the single radio channel) or a small portion of radio frequencies of a radio frequency band. In such a case, the jamming signal is termed herein as a narrowband jamming signal, where the bandwidth of the jamming signal is less than or equal to the bandwidth of a desired signal that can be transmitted over the same radio frequency band. However, some radio jamming devices transmit a jamming signal over some or all radio channels within one or more radio frequency bands. Accordingly, in such a case, the jamming signal is referred to herein as a broadband jamming signal, where the bandwidth of the jamming signal is larger than the bandwidth of a desired signal that can be transmitted over the same radio frequency band. Such broadband jamming signals can disrupt or even block usage of the same channels by communication devices attempting to transmit desired signals.

Accordingly, there is a need for methods and apparatus for detecting presence of a jamming signal, including a broadband jamming signal.

BRIEF DESCRIPTION OF THE DRAWINGS

The accompanying figures, where like reference numerals refer to identical or functionally similar elements throughout the separate views, together with the detailed description below, are incorporated and form part of the specification and serve to further illustrate various embodiments of concepts that include the claimed invention, and to explain various principles and advantages of those embodiments.

FIG. 8 illustrates communication device programming for scanning channels on multiple scan lists to detect a jamming signal in accordance with some embodiments.

Figure 1:
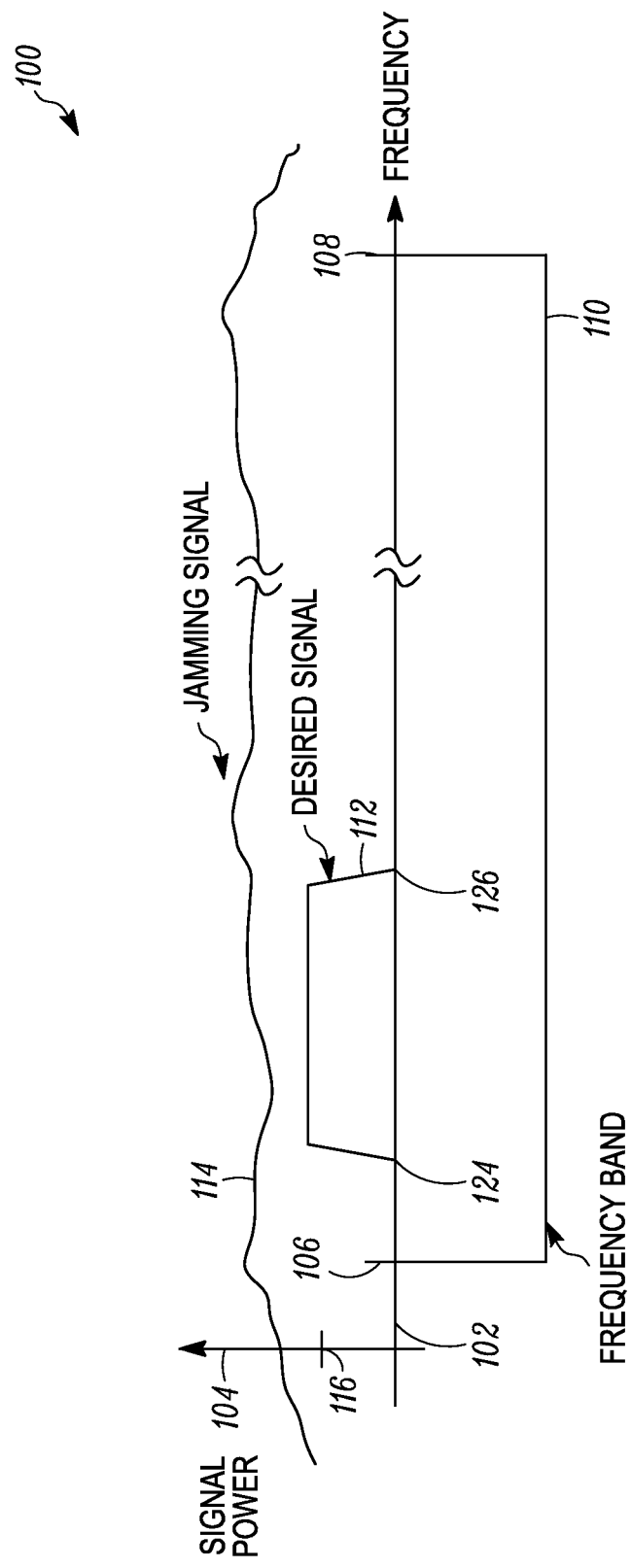
FIG. 1 is a logical radio frequency and signal power diagram illustrating a jamming signal detectable using embodiments of the present teachings.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides methods for detecting presence of a jamming signal. In accordance with the present teachings, a method includes retrieving a scan list comprising multiple radio channels within a first frequency range of operation of the communication device. The method further includes scanning at least a subset of the channels on the scan list to determine, for each scanned channel, whether energy that exceeds an energy threshold is detected on the scanned channel. Moreover, the method includes determining a first quantitative measure based on a first plurality of scanned channels having energy that exceeds the energy threshold and comparing the first quantitative measure to at least a first jamming signal detection threshold. Additionally, the method includes indicating, on the communication device, presence of a jamming signal when the first quantitative measure satisfies the at least a first jamming signal detection threshold.

Further in accordance with the present teachings, a communication device detects, within a first frequency range of operation of the communication device, presence of a jamming signal having a first bandwidth. The communication device includes a network interface, a processing device, and a user interface. The network interface is configured to communicate, within the first frequency range, at least one signal having a second bandwidth, wherein the first bandwidth is greater than the second bandwidth; retrieve a scan list comprising multiple radio channels within the first frequency range, wherein the retrieving is performed in response to a loss of radio communication service to the communication device; and scan at least a subset of the radio channels on the scan list to detect signal strength on each scanned radio channel. The processing device is coupled to the network interface and configured to compare each detected signal strength to a signal strength threshold to determine all scanned channels having a detected signal strength that exceeds the signal strength threshold; derive at least one of multiple quantitative measures based on a plurality of the scanned channels having a detected signal strength that exceeds the signal strength threshold, and compare each derived quantitative measure to a corresponding jamming signal detection threshold to determine presence of the jamming signal within the first frequency range. Moreover, the user interface is coupled to the processing device and configured to provide an indication of the presence of the jamming signal when at least one of the derived quantitative measures satisfies the corresponding jamming signal detection threshold, wherein the user interface is configured to provide the indication of the presence of the jamming signal using at least one of color, sound, or a graph.

Further in accordance with the present teachings is a non-transient computer readable storage element which stores computer readable code. The stored computer readable code programs a computer (within a communication device) to perform a method for detecting presence of a jamming signal. The method includes retrieving a scan list of channels within a frequency band of operation of the communication device, wherein the retrieving is performed in response to a loss of radio communication service to the communication device, and scanning multiple channels on the scan list to determine scanning results indicating, for each scanned channel, whether energy that exceeds an energy threshold is detected on the channel. The method further includes determining, based on the scanning results, a ratio of a total number of scanned channels having energy that exceeds the energy threshold to a total number of scanned channels and a highest number of consecutive scanned channels having energy that exceeds the energy threshold. Additionally, the method includes determining presence of a jamming signal when the ratio exceeds a confidence threshold. Otherwise, the method further includes determining presence of the jamming signal when the highest number of consecutive scanned channels having energy that exceeds the energy threshold exceeds a threshold detection count. Otherwise, the method further includes determining, based on the scanning results, a combination of average energy and standard deviation of energy detected across all scanned channels, and determining presence of the jamming signal when the average energy exceeds an average energy threshold and the standard deviation is below a standard deviation threshold.

Figure 2:
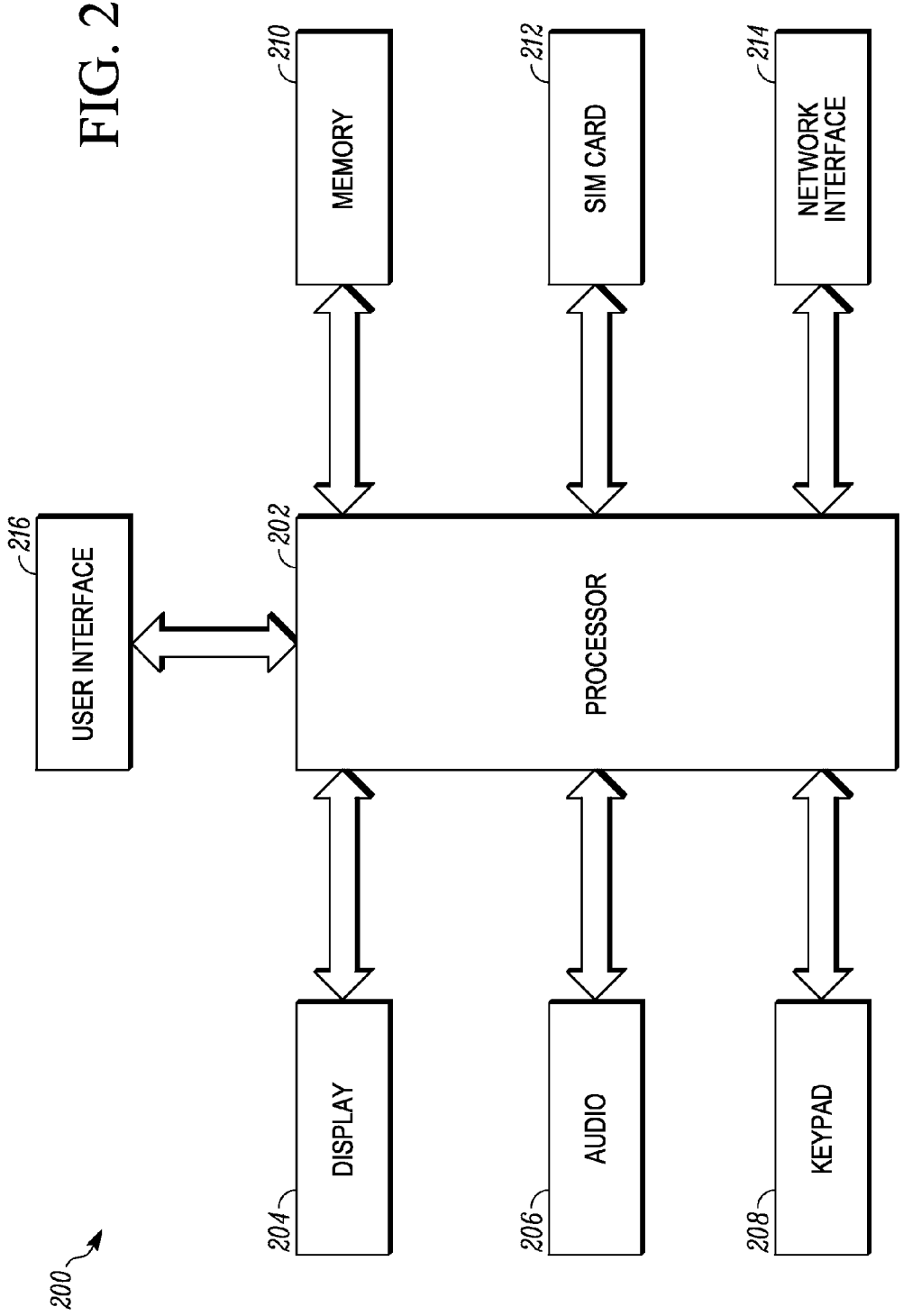
FIG. 2 illustrates a block diagram of a communication device configured in accordance with some embodiments.

Referring now to the drawings, and in particular FIG. 1, a radio frequency and signal power diagram showing an illustrative jamming signal that can be detected using embodiments in accordance with the present teachings is shown and indicated generally at 100. Diagram 100 includes a signal power axis 104 that represents radio signal power, level or strength or radio frequency (RF) energy as measured, for instance, in dBm, and a frequency axis 102 that represents frequency as measured, for instance, in Hz. Illustrated in diagram 100 is a desired signal 112 and a jamming signal 114 transmitted within a frequency range of operation 110 of a communication device (e.g., elements of which are shown in FIG. 2). The frequency range of operation 110 is characterized by a bandwidth, comprising the difference between a lower frequency 106 and an upper frequency 108 in a continuous set of frequencies, over which the communication device is configured and programmed to transmit and receive desired signals.

In one illustrative communication device implementation, the frequency range of operation 110 corresponds to a frequency band of operation for the communication device. Example frequency bands include, but are not limited to, 700, 850 and 1900 MHz bands, cellular (CELL) bands, Personal Communication Service (PCS) bands, etc., wherein each frequency band correlates to a particular licensed block or chunk of radio spectrum. In another illustrative communication device implementation, the frequency range of operation 110 corresponds to a mode of operation of the communication device, wherein the mode of operation correlates to a particular radio access technology used by the communication device. Example modes of operation include, but are not limited to GSM (Global System for Mobile Communications), LTE (Long Term Evolution), CDMA (Code Division Multiple Access), etc., wherein each mode of operation further correlates to a particular block or chunk of the radio spectrum for communicating using that radio access technology. For instance, GSM is used in a number of frequency bands in North America including the 850 and 1900 MHz bands; and LTE is planned for use in the 700/800 and 1700/1900 MHz frequency bands in North America.

The frequency band 110 is further divided into a plurality of channels (not shown) that are available for and/or allocated to devices (such as wireless communication devices and base stations) to transmit signals, such as the desired signal 112. Signal 112 is characterized by a bandwidth, comprising the difference between a lower frequency 124 and an upper frequency 126, and a signal strength 116 over most of the bandwidth of signal 112. As can be seen in FIG. 1, the jamming signal 114 is a broadband jamming signal characterized by a bandwidth that spans the entire frequency band 110 and a signal strength that exceeds the signal strength of the desired signal 112 over the entire frequency band 110 (i.e., over all the channels of the frequency band 110). In such as case, the broadband jamming signal 114 blocks the desired signal 112 from being detected by a receiving device, and also causes communication devices in the area of the jamming signal and attempting to use the frequency band 110 to register a loss of radio communication service or, in short, a loss of service or loss of reception.

A communication device experiences a loss of service when it cannot receive expected control signals on channels as specified by the communication protocols, e.g., standard protocols, the device is using to communicate. For example, the broadband jamming signal 114 prevents a communication device from receiving information in a given channel. After failing to receive required signals for a period of time, the communication device declares a loss of service and indicates to the user that it cannot communicate on the network, for instance, by displaying to the user on a display device an icon that represents a loss of service.

Methods and apparatus in accordance with embodiments of the present teachings are used to detect and narrow down a geographic location (also referred to herein as a "geographic position" and a "location") of a jamming signal, such as the broadband jamming signal 114. Turning now to FIG. 2, an illustrative wireless communication device 200 (or communication device for short) is shown, which is adapted or configured and programmed to perform methods to detect the presence of a jamming signal in accordance with the present teachings, for instance as illustrated by reference to FIGS. 3-8. The communication device 200 comprises a processor 202, which is often referred to as a central processing unit or CPU and is also referred to herein as a processing device and a computer. The processor 202 is coupled to multiple other hardware components that include, but are not limited to, a display 204 (e.g., a touchscreen), an audio user input/output device 206 (e.g., a speaker and microphone), a keypad user input device 208, memory 210, a SIM (Subscriber Identity Module) card 212, and a network interface 214.

Figure 5:
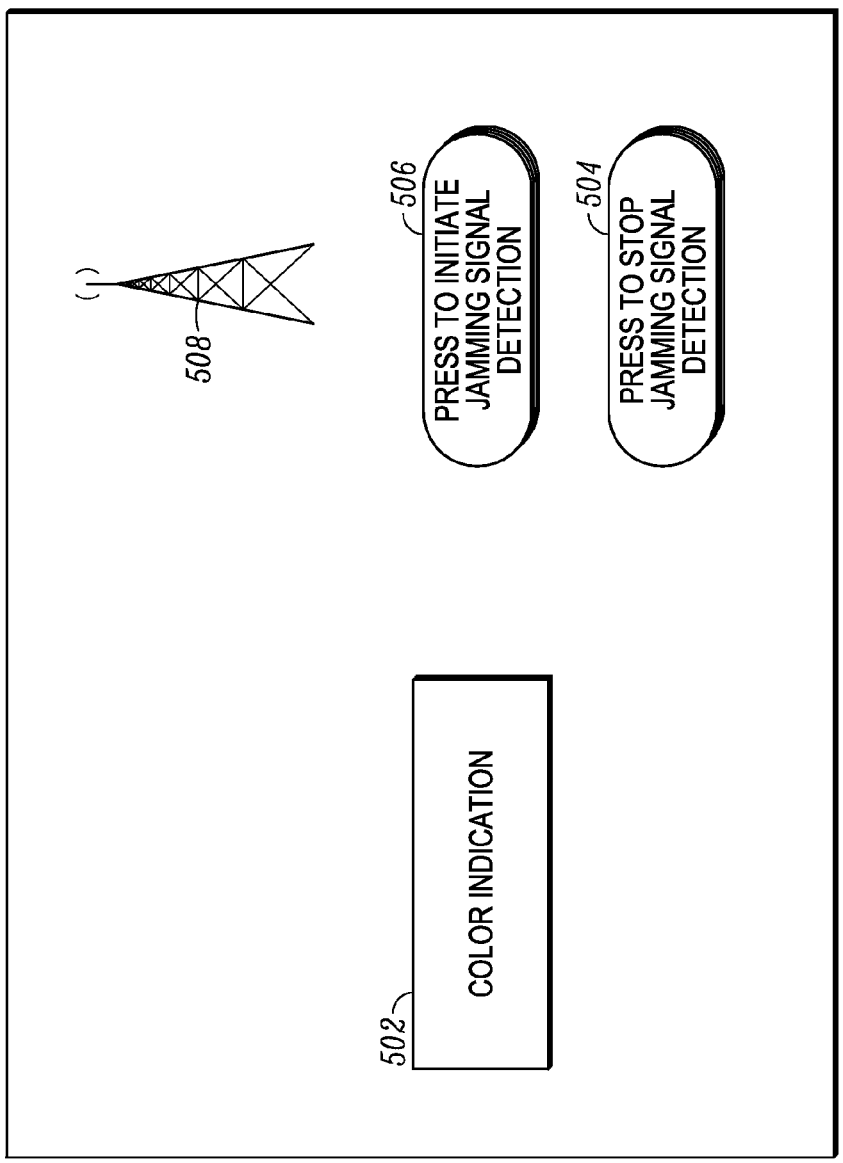
FIG. 5 is a logical representation illustrating a user interface used in detecting presence of a jamming signal in accordance with some embodiments.

Furthermore, the communication device 200 implements a user interface application or software 216 (also referred to herein simply as a "user interface" or "UI") in accordance with the present teachings and as explained in detail by reference to FIGS. 5-7. In one embodiment, the user interface 216 comprises the software portion of a graphical user interface, which also comprises hardware such as the display 204, the audio input/output device 206, and the keypad 208, which are communicatively coupled to the user interface 216 via the processor 202. The user interface 216 is implemented, in one embodiment as shown by reference to FIGS. 5-7, to receive touchscreen input to control a jammer detection application that determines presence of a jamming signal. The user interface 216 also receives input from the jammer detection application to provide through the touchscreen (e.g., 204) and/or the speaker (e.g., 206) an indication of the presence of the jamming signal. The user interface 216 comprises at least a collection of textual and graphical elements displayed by the communication device 200 on the display 204. When the user interface 216 is requested to be launched, it is loaded into the memory 210 and executed by the processor 202. One or more layers of software (such as an operating system) may exist between the user interface 216 and the processor 202.

The processor 202, display 204, audio device 206, keypad 208, memory 210, SIM card 212, and network interface 214 are operatively coupled, and when designed and/or programmed form the means for these elements to implement their desired functionality, for example, as illustrated by reference to FIGS. 3-8. Only a limited number of system components 202 to 214 are shown for ease of illustration; but additional or fewer such components may be included in the communication device 200. Moreover, other components needed for a commercial embodiment of the communication device 200 are omitted from the drawing for clarity in describing the enclosed embodiments. As used herein, the communication device 200 or its elements 202-214 being "configured" or "adapted" means that such elements include the necessary hardware and physical coupling, and when programmed and/or operating, form the means for these system elements to implement their desired functionality, for example, as illustrated by reference to FIGS. 3-8.

More particularly, the network interface 214 comprises software (and/or firmware) and hardware used for: transmitting and receiving desired signals (e.g., packets, datagrams, frames, or any other information blocks) and control information over one or more channels within a frequency range of operation of the communication device; and scanning multiple channels, for instance, in accordance with the present teachings. As such, the network interface 214 comprises elements including processing, modulating, and transceiver elements (including transmitter and receiver apparatus) that are operable in accordance with any one or more standard or proprietary wireless protocols. In an embodiment, some of the functionality of the processing, modulating, and transceiver elements is performed by means of the processor 202 through programmed logic such as software applications or firmware stored on the memory 210 of the communication device 200 or through hardware.

Moreover, in an embodiment, the receiver apparatus of the network interface 214 includes scanner hardware and software that are operable to "scan" multiple channels in a scan list, table, sequence, or file. Scanning a channel means that the receiver tunes to the receive frequency to monitor or detect radio frequency (RF) activity or energy on the corresponding channel. Energy, as used herein, corresponds to electromagnetic radiation through space, as with radio waves. In one example implementation, RF activity or energy level is determined using a received signal strength indicator (RSSI) measurement or some other absolute or relative measurement of signal power, signal strength, or signal level on the channel. Depending on the particular receiver being used, the RF energy measurement is performed in an intermediate frequency (IF) stage before an IF signal amplifier or in a baseband signal path before a baseband amplifier. The receiver may also decode the channel and examine recovered data. Based on the recovered data the energy or quality of the channel can be determined. One example is a CDMA receiver which may use a rake receiver and spreading code to recover data from a channel, and based on examining the recovered data the presence of a channel and the signal strength is determined.

In a further embodiment, the receiver apparatus of the network interface 214 includes geographic positioning apparatus (also referred to herein as a "location device") such as a geographic positioning system (GPS) receiver configured to receive signals to allow or enable the geographic location of the communication device 200 to be determined by a GPS system. Geographic location means a position on the Earth's surface as represented by a set of coordinates comprising numbers and/or letters that provide information regarding at least vertical and horizontal position. A common choice of coordinates comprises latitude, longitude and elevation. The communication device 202 includes any suitable mobile tracking apparatus for use in determining its location including, but not limited to, apparatus that allows the use of multilateration techniques such as GSM localization or other localization technologies that may be network-based, handset-based, SIM-based or a hybrid of such technologies.

The location device is coupled to (e.g., included within) the network interface 214 and configured to determine a location of the communication device 200 when at least one derived quantitative measure satisfies a corresponding jamming signal detection threshold. The communication device is configured to provide, to a second device or external device (such as a server) using the network interface 214, an indication of the presence of the jamming signal and the location of the communication device. In a further embodiment, the communication device 200 includes a jamming signal detection application, algorithm or procedure that controls the processor 202 to determine when to provide the location information for the communication device 200 and other data to the server, which, for instance, provides services for multiple communication devices, in a certain agency or organization.

The SIM card 212 is an IC that securely stores information such as the International Mobile Subscriber Identity (IMSI) and a related key used to identify and authenticate a subscriber (i.e., user) operating the communication device 200. In an embodiment, the SIM card provides mobile tracking functionality. The processing device 202 utilized by the elements of communication device 200 may be partially implemented in hardware and, thereby, programmed with software or firmware logic or code for performing functionality described by reference to FIGS. 3-8; and/or the processing device 202 may be completely implemented in hardware, for example, as a state machine or ASIC (application specific integrated circuit). The memory 210 comprises a logical representation of one or more different types of memory elements of the communication device 200. For example, the memory 210 represents one or a combination of short-term, long-term, volatile, and/or non-volatile storage of a variety of information needed for the functioning of the respective elements of the communication device 200. The memory 210 may further store software or firmware for programming the processing device 202 with the logic or code needed to perform its functionality.

In one illustrative implementation, the communication device 200 is a cellular phone, such as a smartphone. However, the communication device 200 can be any type of wireless communication device such as a portable radio, a mobile radio, a Personal Digital Assistant (PDA), a laptop, a tablet, etc. The communication device 200 uses one or more radio access technologies, e.g., GSM, LTE, CDMA, etc., to transmit or receive signals over one or more channels of a frequency range of operation of the communication device. While the communication device is using a particular radio access technology, the device is said to be operating in a corresponding mode of operation or mode. For example, where the communication device 200 uses the CDMA or GSM channel access method to transmit and/or receive signals over a frequency channel or band, the communication device 200 is said to be in a CDMA or GSM mode of operation, respectively.

Figure 3:
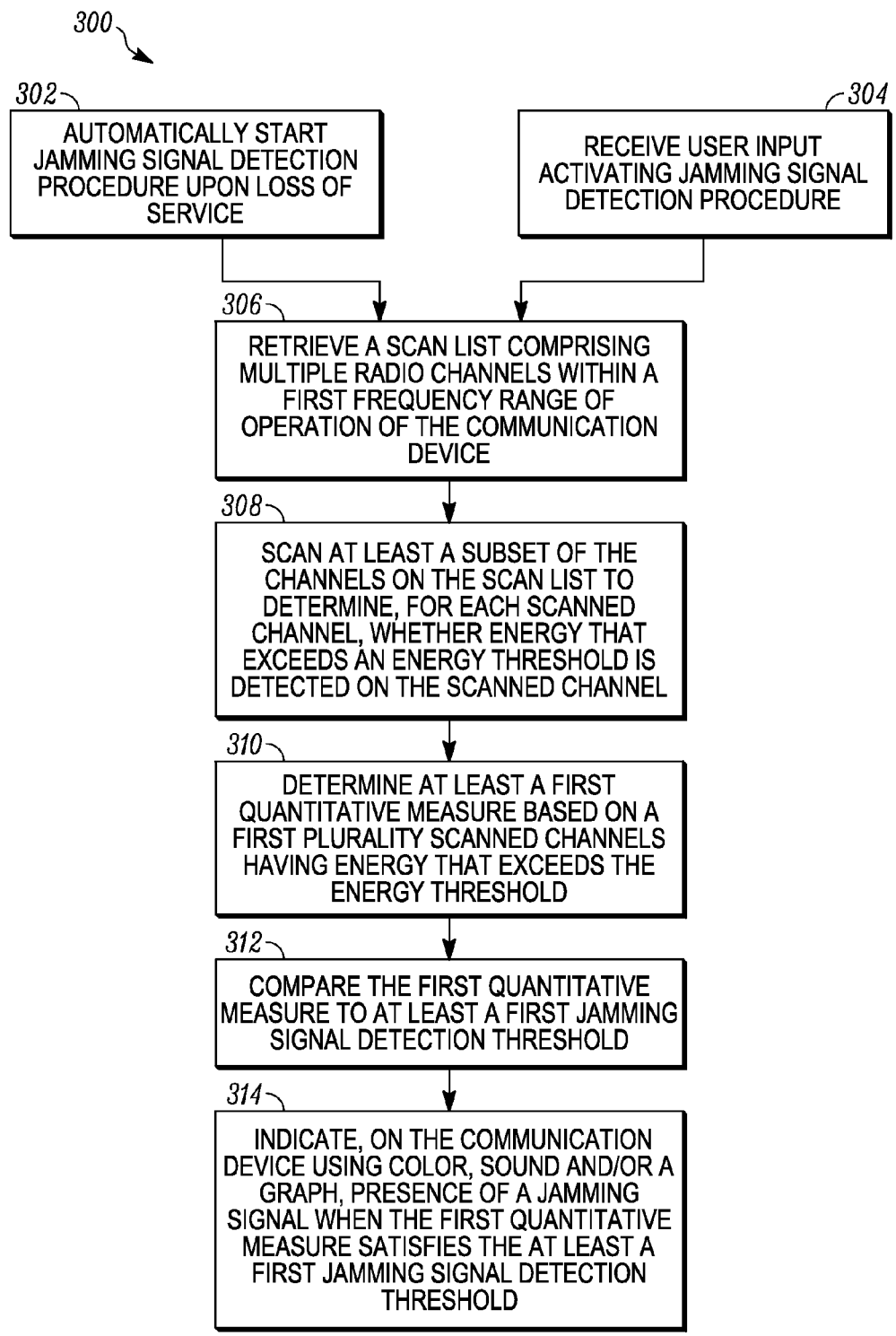
FIG. 3 is a logical flowchart illustrating a method for detecting presence of a jamming signal in accordance with some embodiments.

We now turn to a detailed description of the functionality of elements of the communication device 200 in accordance with the teachings herein and by reference to the remaining figures. Referring now to FIG. 3, an illustrative logical flow diagram shows a general method 300 for detecting presence of a jamming signal. In one illustrative implementation, the communication device 200 is configured to communicate, within a first frequency range, a signal having a first bandwidth, wherein a jamming signal has a second bandwidth that is greater than the first bandwidth. For example, the communication device 200 is configured to communicate (e.g., transmit or receive) the desired signal 112, within the frequency range of operation 110 of the communication device; and the method 300 is used to detect the broadband jamming signal 114, which prevents communication of the signal 112. More particularly, since the broadband jamming signal 114 is transmitted over a larger frequency range than the frequency band 110 of operation of the communication device 200, the communication device experiences a loss of service.

Upon receiving a trigger, e.g., 302 or 304, the communication device 200 retrieves (306) a scan list and performs an algorithm or application (for instance method 300 or 400 of FIG. 4) to determine presence of a jamming signal. Any number of events can trigger the communication device 200 to perform the method 300, including a loss of service (e.g., a complete loss of service or intermittent or sporadic losses of service) or reception of user input activating the jamming signal detection procedure.

For example, where a broadband jamming device continuously transmits radio jamming signals over one or more channels, over which the communication device 200 communicates with a base station, the desired signals are interfered with by the broadband jamming signals. Accordingly, the communication device 200 fails to properly receive signals from and/or send signals to the base station. In such a case, the communication device 200 determines that it has lost radio service from the base station. Therefore, at 302, upon loss of service, the communication device 200 automatically (meaning without relying on user interaction with or user input into the communication device 200) retrieves a scan list and starts the jamming signal detection procedure. In such a case, retrieving the scan list is performed in response to a loss of radio communication service to the communication device. Furthermore, retrieving the scan list is triggered, automatically, without user input, upon loss of radio communication service to the communication device.

In another example implementation, shown by reference to 304, the communication device 200 receives user input, thereby, activating a jamming signal detection procedure in accordance with the present disclosure. For instance, when a user of the communication device 200 observes loss of service or sporadic or weak service in an area where signal strength is typically known to be good for successful communications, the user selects an icon or button on the display of the communication device to start the jamming signal detection procedure. In an embodiment, as illustrated by reference to FIG. 5, the user interface 216 presents, on the touch screen 204 of the communication device 200, a signal strength icon 508 (that indicates a loss of service or, as shown, a weak signal) and a button or icon 506 for the user to initiate the jamming signal detection procedure. In such a case, retrieving the scan list (and performing method 300) is triggered by user input into a (graphical) user interface of the communication device. In a different implementation, the user presses a physical button (not shown) on the communication device 200 to initiate the jamming detection procedure.

As mentioned above, at 306, upon receiving the trigger to start the jamming signal detection procedure or algorithm, the communication device 200 retrieves a scan list comprising multiple radio channels within a first frequency range of operation of the communication device. As used herein, a scan list is preprogrammed list of receive frequencies corresponding to channels within a range of operation of a communication device. In an embodiment, the scan list is ordered based on frequency. An illustrative entry (or scan member) on a scan list comprises, for instance, at least a receive frequency and bandwidth corresponding to a given channel. Each scan list is stored in memory (e.g., 210) of the communication device 200; and the communication device 200 is programmed to transmit and/or receive signals over at least some of the channels contained in the scan list.

In one particular embodiment, a scan list (and consequently the scanned channels from the scan list) comprises or identifies at least one "unassigned" channel, which is defined as a channel within a frequency band that is not assigned by the network for communications between devices. Scanning specifically for these unassigned channels increases the probability of positively detecting a broadband jamming signal, which typically interferes with or jams at least one and perhaps multiple entire frequency bands, including the unassigned channels within these bands. Moreover, in one illustrative implementation, a scan list (and the channels contained therein) is associated with or correlates to a particular frequency band or chunk of licensed spectrum, e.g., cellular, PCS, 700 MHz, etc., over which the communication device 200 is programmed to operate. In another illustrative implementation, the scan list is associated with or correlates to a particular mode of operation (such as CDMA, LTE or GSM) of the communication device 200.

At 308, the communication device 200 scans at least a subset of the channels on the retrieved scan list to determine scanning results. The scanning results indicate, for each scanned channel, whether energy (e.g., a measured energy level) that exceeds an energy threshold is detected on the scanned channel. The energy threshold is a value that is expressed in energy units such as dBm and stored in memory, such as non-volatile random access memory. In one illustrative implementation, the communication device 200 scans the channels to detect or monitor the presence of radio waves (which is a form of energy) that exceeds an energy threshold (e.g., a signal strength threshold).

For example, scanning a channel includes tuning a radio device (e.g., a radio receiver) to the channel and measuring the power of the received energy on the scanned channel by converting radio waves transmitted over the channel to electric currents and determining the energy strength of the electric currents. Generally, at a physical location, signal strength is affected by the power delivered to a transmitting antenna, the physical location's geometric relationship with the transmitting antenna, and radiation resistance of the signal. Additionally, as propagation and signal strength change depending on the underlying frequencies and type of transmission, the signal strength threshold used is reliant on the mode of operation of the underlying communication device and the frequency band comprising the channel. Therefore, in an embodiment, there are different thresholds corresponding to the different bands and/or modes over which the communication device 200 operates. Moreover, a rate of scanning can be changed to optimize use of the jamming signal detection application under varying conditions. More particularly, decreasing the scanning speed leads to less battery consumption, while increasing the scanning speed leads to a faster application response time.

As mentioned earlier, the communication device 200 determines whether detected energy on the scanned channel exceeds the energy threshold to form, create or generate a scanning result for the scanned channel. For example, the scanning result for a given scanned channel is an integer value of one (1) where the detected energy exceeds the energy threshold. Otherwise, the scanning result for that scanned channel is an integer value of zero (0). In a further implementation, the scanning result includes a value that equals the measured level of detected energy.

At 310, the communication device 200 determines at least a first quantitative measure based on a first plurality scanned channels having energy that exceeds the energy threshold. In other words, the communication device determines one or more measured parameters that are each derived, at least, from a measurement of a quantity of energy on each scanned channel that contained energy that exceeded the energy threshold. For example, the first quantitative measure comprises a ratio of the number of scanned channels having energy (e.g., detected signal strength) that exceeds the energy threshold (e.g., signal strength threshold) to the total number of scanned channels. In another example implementation, the first quantitative measure is the highest (i.e., largest) number of consecutive channels having energy that exceeds the energy threshold. In a further example implementation, the first quantitative measure comprises a combination of average energy level and standard deviation of energy level detected across all scanned channels.

At 312, the communication device 200 compares the first quantitative measure to at least a first jamming signal detection threshold. The number of jamming signal detections thresholds used in the comparison depends on the particular quantitative measure that was derived. For example, where the quantitative measure comprises the combination of average energy level and standard deviation of energy level detected across all scanned channels, two jamming signal detection thresholds are used in the comparison, e.g., an average energy level threshold and a standard deviation threshold. Whereas, where the quantitative measure is a ratio of the number of scanned channels having energy that exceeds the energy threshold to the total number of scanned channels, a single jamming signal threshold is used in the comparison, e.g., a percentage value such as ninety percent.

Where the first quantitative measure satisfies the at least a first broadband jamming signal detection threshold, the communication device 200 determines that a broadband jamming signal is present over the scanned channels. Correspondingly, at 314, the communication device 200 indicates, using its UI 216 and hardware components, e.g., the display 204 and/or the speaker 206, presence of a jamming signal when the first quantitative measure satisfies the at least a first jamming signal detection threshold. In an embodiment, the presence of the jamming signal is indicated on the communication device using one or more of color, sound, or a graph, for instance as described later by reference to FIGS. 5-7. For example, the jamming signal application (executed on the communication device) sends simple notifications to the UI 216 of results of whether or not a jamming signal is present within a given frequency band, for display of such results to the user on a display device. Alternatively, the jamming signal application sends the signal strength data for the scanned channels to the UI to provide a more complicated graphical indication to the user of the presence of a jamming signal within one or more frequency bands.

Moreover, "presence" of the jamming signal can be expressed or communicated in relative terms depending on the confidence level of the quantitative measure that was used. More particular, some quantitative measures indicate a greater likelihood than other quantitative measures that a jamming device is being used in the area. Accordingly, such likelihood of the presence of a jamming signal (e.g., a stronger likelihood equates to the jamming signal being "present" and a weaker likelihood equates to a "probable presence" of a jamming signal) can be communicated to a user through different sounds and/or colors and graphics.

In a particular embodiment, the communication device 200 is programmed via the algorithm stored in its memory to derive multiple such quantitative measures that are successively applied. For example, when the first quantitative measure fails to satisfy the at least a first jamming signal detection threshold, the communication device compares a derived second quantitative measure to at least a second jamming signal detection threshold. The second quantitative measure is also determined based on a plurality (e.g., a second plurality that may be different from the first plurality) of scanned channels having energy that exceeds the energy threshold. The communication device then indicates using the display and/or speaker the presence of a jamming signal when the second quantitative measure satisfies the at least a second jamming signal detection threshold.

Furthermore, when the second quantitative measure fails to satisfy the at least a second jamming signal detection threshold, the communication device compares a derived third quantitative measure to at least a third jamming signal detection threshold. The third quantitative measure is also determined based on a plurality (e.g., a third plurality that may be different from the first and/or second plurality) of scanned channels having energy that exceeds the energy threshold. The communication device then indicates using the display and/or speaker the presence of a jamming signal when the third quantitative measure satisfies the at least a second jamming signal detection threshold. In a further embodiment, the communication device indicates using sound or graphics the absence or lack of the presence of a jamming signal when none of the derived quantitative measures satisfy corresponding jamming signal detection thresholds.

Figure 4B:
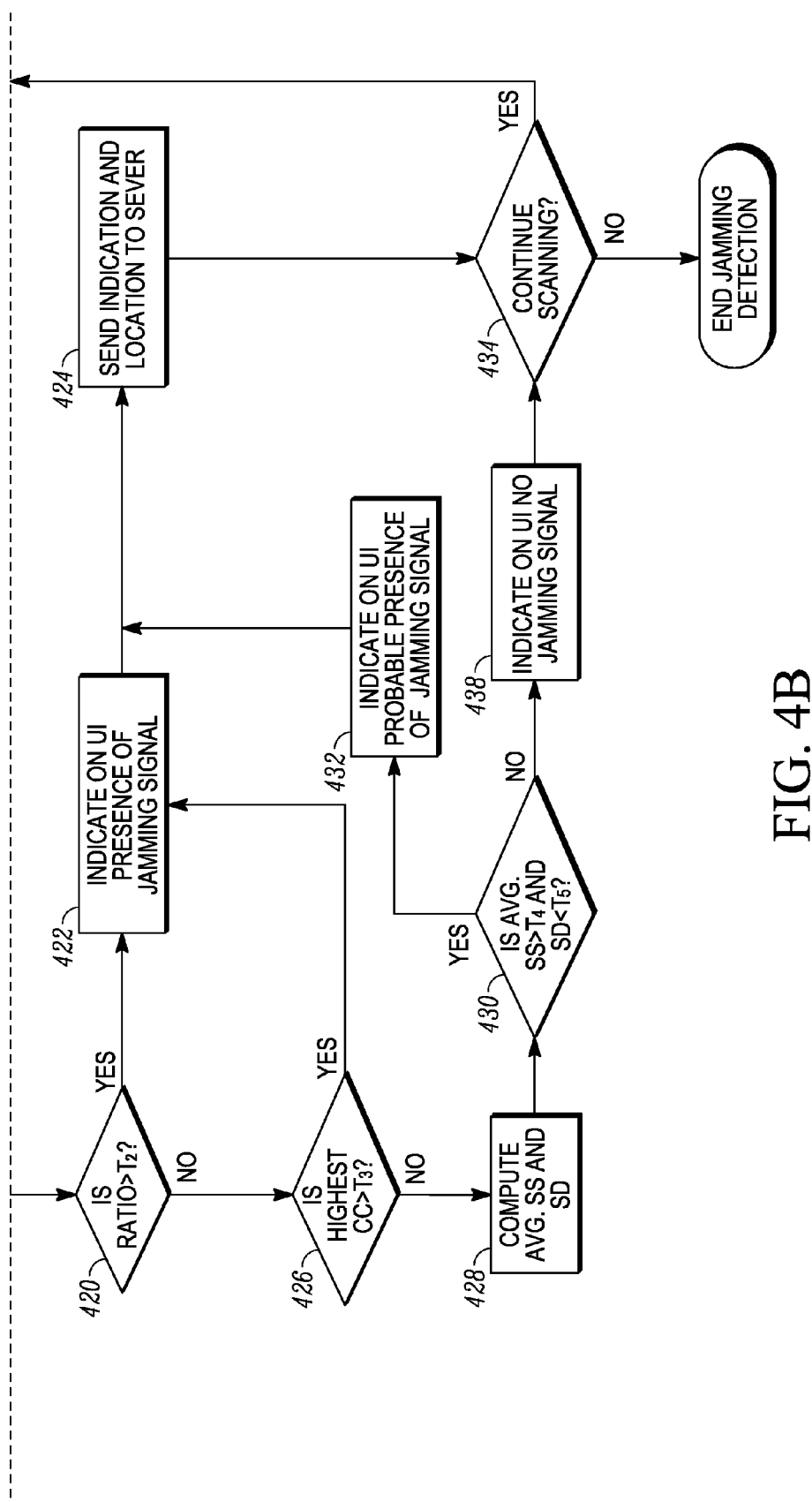
FIG. 4 is a logical flowchart illustrating a method for detecting presence of a jamming signal in accordance with some embodiments.

FIG. 4 presents one example of a jamming signal detection procedure, application or algorithm that successively applies multiple, in this case three quantitative measures to determine the presence of a jamming signal, such as a broadband jamming signal 114. More particularly, the multiple (e.g., first, second and third) quantitative measures comprise: a ratio of a total number of scanned channels having signal strength that exceeds the signal strength threshold to a total number of scanned channels; a highest number of consecutive scanned channels having signal strength that exceeds the signal strength threshold; and a combination of average signal strength and standard deviation of signal strength detected across all scanned channels.

In this illustrative embodiment, the jamming signal detection procedure is initiated by user input, such as by a user pressing the button 504 (see FIG. 5, described below) on the touch screen 204. Responsively, normal transmit and receive operations are suspended to perform the detection procedure. In addition, in at least one example implementation, the algorithm illustrated by reference to FIG. 4 uses preprogrammed scanned lists to check each band and mode of operation of the communication device 200 for the presence of a jamming signal. Accordingly, the communication device executes the jamming detection application until all bands and/or modes have been scanned and evaluated at least once for the presence of a jamming signal or the user pressed a button (e.g., a button 504 of FIG. 5) to stop the jamming signal detection procedure. In a particular embodiment, each band and mode is associated with a different set of thresholds, which is stored in the non-volatile random access memory. All or just some of the applicable thresholds for the different bands and/or modes can be different.

Turning now to the details of the method of FIG. 4, therein is illustrated a logical flowchart showing a method 400 representing an application performed by the communication device 200 for detecting the presence of a jamming signal, such as the broadband jamming signal 114. Accordingly, as relates to method 400, the communication device performing certain functionality means that such functionality is performed by relevant hardware, software, and or firmware residing in the communication device 200, for instance as described above with respect to FIG. 2.

At 402, the communication device 200 initializes detection counts to an integer value of zero. The detection counts include a total detection count (TC), a consecutive detection count (CC), and a highest consecutive detection count (highest CC). The total detection count tracks the number of scanned channels that have a detected signal strength (SS) that exceeds a signal strength threshold ($T_1$) for the corresponding band or mode. The consecutive detection count tracks a current number of consecutive scanned channels that have a detected signal strength that exceeds $T_1$. The highest consecutive detection count tracks the largest number of consecutive scanned channels (for a given band or mode) that have a detected signal strength that exceeds $T_1$.

At 404, the communication device 200 obtains or retrieves a scan list for a frequency range correlating to a particular frequency band and/or mode of operation of the communication device 200. In an embodiment, the band or mode first selected is the band or mode over which the communication device was operating when service was lost. However, any suitable selection methodology can be used to cycle through the bands and modes for scanning. FIG. 8 shows a table 800 that illustrates example scan programming for a communication device that operates over several bands (CELL, PCS, 700 and MHz) listed in column 812 and modes (CDMA, GSM, and LTE) listed in column 814.

Rows 802-808 correspond to different scan lists, wherein each scan list further corresponds to a frequency band and a mode of operation for the communication device 200. For this illustrative implementation, the communication device is, accordingly, programmed with four different scan lists. Moreover, column 810 directs the communication device 200 as to which channels on the scan list are to be scanned during the jamming detection algorithm. For example, for the scan list associated with row 802, every third channel in the scan list is scanned. However, for the scan list associated with row 806, all channels in the scan list are scanned.

Upon retrieving the scan list, at 406, the communication device 200 scans a channel (e.g., a first channel) from the scan list, which is ordered by frequency, and measures or determines the signal strength of any detected signal or energy on the channel. At 408, the communication device 200 checks whether the detected signal strength (SS) of the scanned channel is above or exceeds a predetermined and stored signal strength or energy threshold ($T_1$). If the detected signal strength is equal to or below the signal strength threshold T₁, the communication device 200, at 416, determines whether there are more channels in the scan list to scan. Where there are one or more additional channels to scan, the communication device 200 selects and scans the next channel at 406.

Turning back to 408, where the detected signal strength is above the signal strength threshold for the scanned channel, the communication device 200, at 410, increments the total detection count (TC) by one. At 412, the communication device 200 checks whether the detected signal strength of the immediately preceding (i.e., last) scanned channel was above the signal strength threshold T₁. If so, the consecutive detection count (CC) is incremented by one at 414; and the communication device 200, at 416, determines whether there are more channels in the scan list to scan. Otherwise, at 436, the communication device 200 compares the value of the highest consecutive detection count (highest CC) to the value of consecutive detection count (CC). Where CC is larger than highest CC, the value of highest CC is updated to equal the value of CC. Furthermore, at 436, the consecutive detection count is reset to a value of zero. Thereafter, the communication device 200, at 416, determines whether there are more channels in the scan list to scan.

Where there are no more channels in the scan list to scan, at 418, the communication device 200 computes TC/TSC, which is the ratio of the total detection count (TC) over the total number of scanned channels (TSC) from the scan list for the frequency band/mode. At 420, the communication device 200 determines whether the computed ratio is above a confidence threshold (T₂, such as ninety percent or ninety five percent). As used herein, the confidence threshold is a jamming signal detection threshold corresponding to the total detection count, which is one of the multiple quantitative measures used by the jamming detection application. Where the computed ratio is above the confidence threshold, a broadband jamming signal is determined to be present on the scanned channels.

Accordingly, at 422, the communication device 200 indicates presence of the broadband jamming signal via a UI (e.g., the user interface 216 in the illustrative embodiment) using color, sound, and/or a color coded graph, for instance, as illustrated by reference to FIGS. 5-7. Turning first to FIG. 5, a logical representation of the user interface 216 in accordance with the present teachings is shown. The user interface 216 includes a color indication 502 which provide visual feedback of jamming signal detection on a display 204, such as a touchscreen, of the communication device 200. The user interface 216 further presents two buttons 506 and 504, that allow a user to initiate and stop, respectively, the jamming signal detection procedure, e.g., 400. As mentioned above, the user interface 216 is further adapted to provide other types of feedback (such as a sound played by the audio device 206) to a user of the communication device 200. Additionally, the user interface 216 presents the icon 508 that indicates whether communication service is available and the level of signal strength over the frequency range of operation of the communication device 200.

Figure 6:
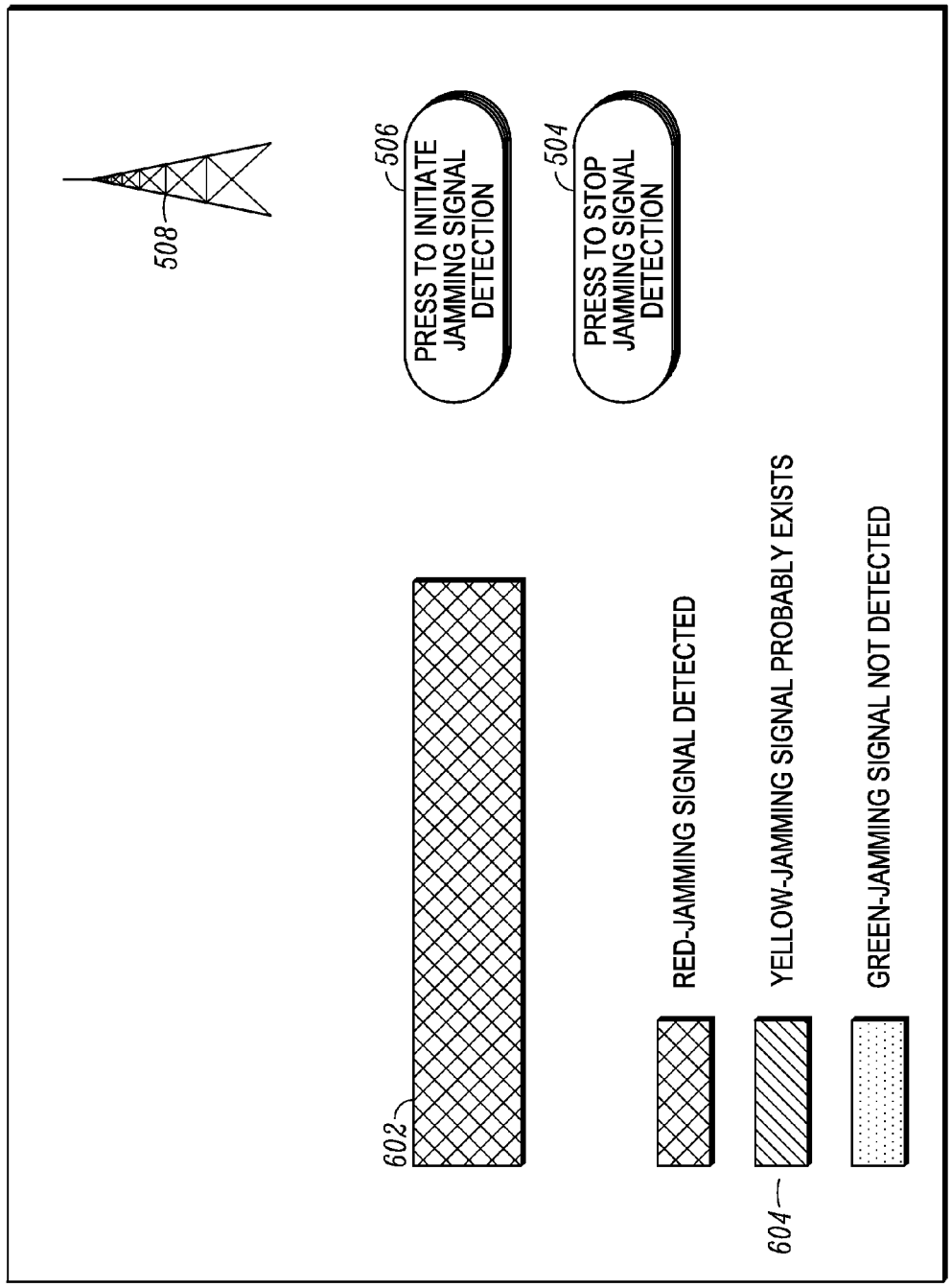
FIG. 6 is a screen snapshot illustrating a user interface used in detecting presence of a jamming signal in accordance with some embodiments.
Figure 7:
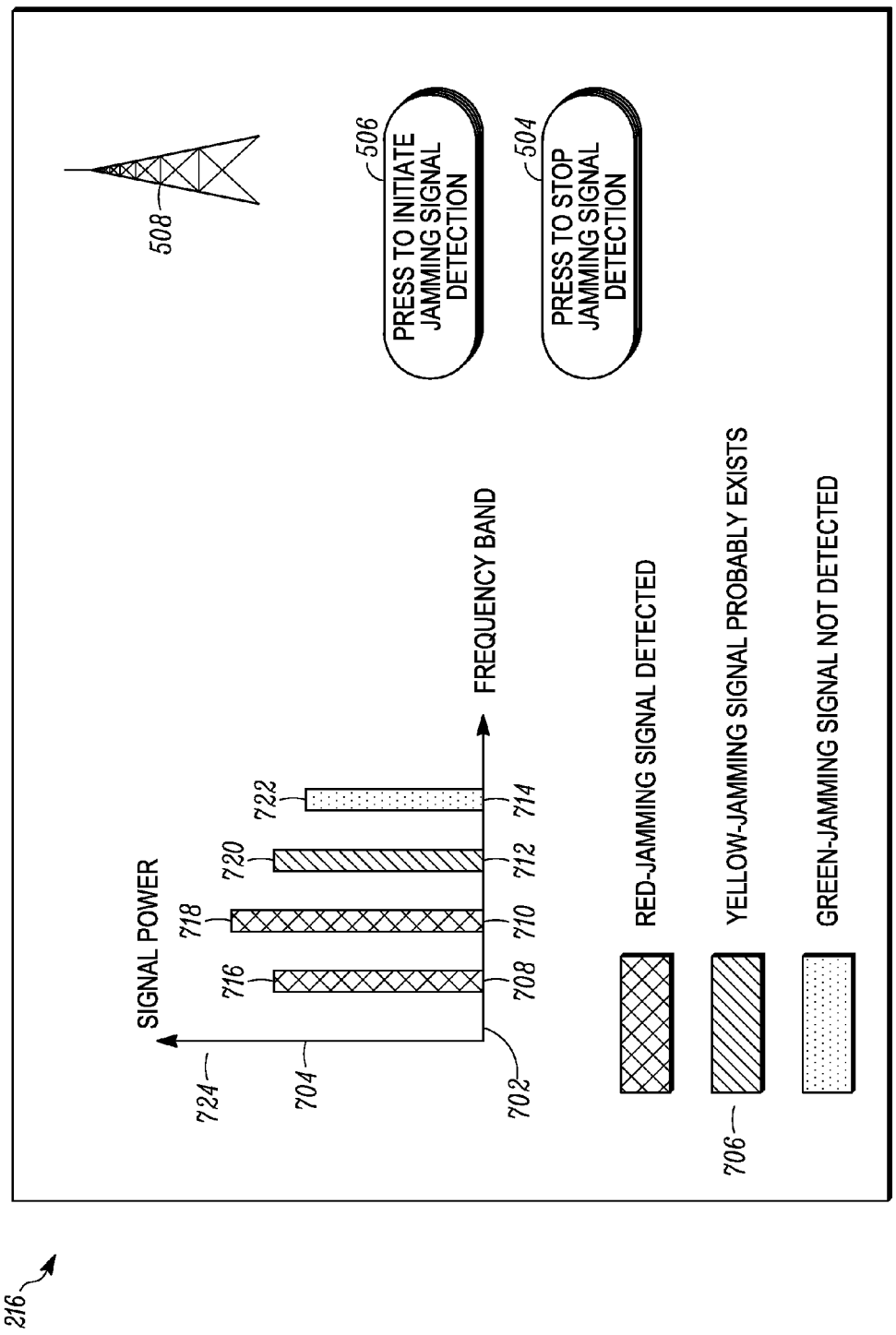
FIG. 7 is a screen snapshot illustrating a user interface using in detecting presence of a jamming signal in accordance with some embodiments.

FIGS. 6 and 7 are snapshots of different embodiments of the user interface 216. Referring first to FIG. 6, the color indication 502 is implemented as a color bar 602. As indicated by an example color legend 604 (which shows different hash markings corresponding to different colors), the color bar 602 is displayed in different colors depending of the results from the jamming detection procedure. For instance, the color bar 602 is displayed in the color red when a broadband jamming signal is detected, and displayed in the color yellow when the communication device determines a probable presence of the broadband jamming signal on at least some of the scanned channels. Similarly, the color bar 602 is displayed in the color green when a broadband jamming signal is not detected. Additionally, the signal strength icon 508 indicates the loss of service or the signal strength over a frequency range of operation of the communication device 200; and the buttons 506 and 504 are presented to the user to initiate and stop the jamming detection procedure. In a further implementation, for each of the three visual indications recited here, the communication device 200 plays a corresponding sound using the speaker 206, to provide audio indication for users.

Referring now to FIG. 7, the color indication 502 is implemented as a color bar chart 724 which includes a frequency band axis 702 and a signal power axis 704. Accordingly, it can be said that the presence of the jamming signal is indicated on the communication device 200 using a graph. In this illustration, four frequency bands 708-714 are included in the chart 724. As indicated by an example color legend 704 (which shows different hash markings corresponding to different colors), color bar charts are displayed in different colors depending on the results from the jamming detection procedure. For instance, a red bar chart is displayed when a broadband jamming signal is detected; a yellow bar chart is displayed when the broadband jamming signal is probably present; and a green bar chart is displayed when a broadband jamming signal is not detected.

For each of the four frequency bands 708-714, broadband jamming signal detection is performed and the corresponding detection results are indicated at 716-722 respectively. For example, a broadband jamming signal is detected on both frequency bands 708 and 710, while a broadband jamming signal is probably present on the frequency band 712. Additionally, in this illustration, broadband jamming signals are not detected on the frequency band 714. Additionally, the UI 216 presents the icon 508 and buttons 504 and 506 (as explained earlier), and may also present audio indications corresponding to the jamming signal detection results.

It should be noted that the UI 216, in alternative implementations, may present more or less detailed graphs or other indications. For example, in one embodiment, the UI displays an x-y ploy of signal strength observed for each channel within a particular frequency band currently being scanned. Using such an advanced display of the scanning and jamming detection data, the user could move the communication device 200 around to better pinpoint a location of the jamming signal based on the signal strength within certain channels of certain bands or within certain modes of operation. Moreover, wherein multiple bands and/or modes are scanned and evaluated, a new and corresponding UI indication (color, sound and/or graph) is provided for each band and/or mode.

Returning the method 400, at 424, the communication device 200 sends its geographic position, time when the broadband jamming signal is detected, and indication of presence of the broadband jamming signal and/or the scanning results (e.g., the signal strength data) to an external device, such as a server. Accordingly, the communication device 200 indicates, to the server, the presence of the jamming signal and a geographic position of the communication device at a time when the quantitative measure satisfies the jamming signal detection threshold. In one implementation, the geographic position is the GPS location of the communication device 200.

In one illustrative implementation, the jamming signal is present on a first set of channels within the frequency range that includes the scanned channels, and the presence of the jamming signal is indicated to the server using a second set of channels that is different than the first set of channels. The second set of channels may be from the same frequency band or mode of operation or a different frequency band or mode of operation. Alternatively, the communication device 200 records its geographic position, time, and presence of the broadband jamming signal. At a later time, such as when the communication device 200 no longer has interference from broadband jamming signals, it sends the recorded data to the server. In such a case, indicating the presence of the broadband jamming signal is performed at a later time when the broadband jamming signal is no longer present. Using such data collected over time, the server can pin-point the location of a broadband jamming device.

Turning back to 420, where the computed ratio is below or the same as the confidence threshold ($T_2$), the communication device 200, at 426, checks whether the highest consecutive detection count (TCC) is larger than a detection count threshold ($T_3$, such as eight or ten) for the scanned channels. If so, the communication device 200 performs 422 and 424. The larger the detection count threshold $T_3$, the higher the confidence in the presence of a broadband jamming signal. Empirical data can be used to determine the detection count threshold $T_3$ or any of the other jamming signal detection thresholds (e.g., $T_2$, $T_4$, or $T_5$) described herein. Also, as mentioned above, the threshold values may further depend on the frequency band and or mode of operation during the scanning.

Turning back to 426, where the highest consecutive detection count is the same as or smaller than the detection count threshold, the communication device 200, at 428, computes an average signal strength (avg. SS) and standard deviation (SD) of signal strength of the scanned channels. At 430, the communication device 200 determines whether the average signal strength is above an average signal strength threshold ($T_4$) and whether the standard deviation below a standard deviation threshold ($T_5$) for the scanned channels having detected energy. If so, these results correspond to a given "floor" or baseline of energy being detected over the multiple scanned channels; and a broadband jamming signal is, therefore, more than likely present on the scanned channels, Accordingly, at 432, probable presence of the broadband jamming signal is indicated on the UI using color, sound, and/or a color coded graph. Furthermore, at 424, the communication device 200 sends its GPS location and a time when the probable detection was determined, and an indication (e.g., simple notification and/or scanning data) of the probable presence of the broadband jamming signal to the server.

Turning back to 430, where the average signal strength is the same as or smaller than the average signal strength threshold or the standard deviation is the same as or larger than the standard deviation threshold, the communication device UI 216, at 438, presents on the display 204, using color, sound, and/or graph, the lack or absence of the presence of a broadband jamming signal on the scanned channels. At 434, the communication device 200 determines whether to continue scanning. Where there are additional frequency bands and/or modes to process, the algorithm returns to block 402 to initialize the detection counts and retrieve the next scan list, at 404. Otherwise, where there are no additional frequency bands and/or modes to process, or the user presses the button 504 to stop the jamming signal detection algorithm, the communication device ends the algorithm.

In another embodiment, described by reference to FIG. 4, a jamming signal detection application is automatically started upon a loss of radio communication service by the communication device 200. The application is similar to the manually started application except that additional timers are used to enable the jamming signal detection algorithm to share time with the normal device operations as the communication device 200 attempts to regain service. More particularly, upon a loss of service, the communication device starts a jammer signal detection initiation timer. The timer has a duration that is long enough to prevent the triggering the start of the jamming detection procedure for short duration signal fades.

Before the timer expires, the communication device continues to regain service, for instance by checking for the applicable control signals that indicate that service is present within a given frequency band. If service is found, the communication device continues normal operations including transmitting and receiving desired signals. However, if the timer expires, the communication device automatically launches the jamming signal detection application, and performs functions 402-432 and 436-438 (as applicable) as of FIG. 4 for the first selected band and/or mode.

If jamming detection results for the first selected band/or mode indicates no jamming signal is present, a jammer rest period timer is set to allow for the communication device 200 to again attempt to regain service. If service is found, the communication device 200 resumes normal transmit and receive operations. Otherwise, if the jammer rest period timer expires, the communication device resumes the jamming signal detection application with the next frequency band and/or mode.

As long as no jamming signal is detected, the jamming signal detection application is paused during the duration of the jammer rest period timer. However, if a jamming signal is probably or likely detected on any frequency band and/or mode, the communication device 200 scans and evaluates all of the bands/modes once; indicates results via the UI 216 after scanning and evaluating each band/mode; stores the results and scanning data; and sets a reduced jammer rest period timer (during which time the communication device 200 attempts to regain service) before repeating the jamming detection procedure with the first selected band and/or mode.

If a jamming signal is detected on any frequency band and/or mode, the communication device 200 sets a jammer verify period timer for a predetermined amount if time (e.g., a few seconds), which is a dedicated amount of time for performing the jamming signal detection algorithm. While this timer is running, the communication device does not attempt to regain service. Accordingly, while this timer is running, the communication device 200: continuously scans and evaluates all of the bands/modes; indicates results via the UI 216 after scanning and evaluating each band/mode; and stores the results and scanning data. In an embodiment, the communication device 200 provides the stored results and/or scanning data to a service upon resuming service.

In accordance with the present teachings, a communication device such as a portable device, PDA, laptop, or smartphone adapted with a user interface, scanning features, and a jamming detection application can detect for the presence of jamming signals, such as broadband jamming signals. These and other benefits can be realized with the present disclosure.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method for detecting presence of a broadband jamming signal as described herein. The non-processor circuits may include, but are not limited to, a radio receiver, a radio transmitter, signal drivers, clock circuits, power source circuits, and user input devices. As such, these functions may be interpreted as steps of a method to perform the detecting presence of a broadband jamming signal. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Both the state machine and ASIC are considered herein as a "processing device" for purposes of the foregoing discussion and claim language.

Moreover, an embodiment can be implemented as a non-transient computer-readable storage element or medium having computer readable code stored thereon for programming a computer (e.g., comprising a processing device) to perform a method as described and claimed herein. Examples of such computer-readable storage elements include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method, performed in a communication device, for detecting presence of a jamming signal, the method comprising:
    retrieving a scan list comprising multiple radio channels within a first frequency range of operation of the communication device;
    scanning a subset of the channels on the scan list to determine, for each scanned channel, whether energy that exceeds an energy threshold is detected on the scanned channel;
    determining a first quantitative measure of a first plurality of the scanned subset of the channels having energy that exceeds the energy threshold;
    comparing the first quantitative measure to at least a first jamming signal detection threshold;
    indicating, on the communication device, presence of a jamming signal when the first quantitative measure satisfies the at least the first jamming signal detection threshold;
    when the first quantitative measure fails to satisfy the at least the first jamming signal detection threshold, comparing a second quantitative measure to at least a second jamming signal detection threshold, wherein the second quantitative measure is determined based on a second plurality of the scanned subset of the channels having energy that exceeds the energy threshold; and
    indicating, on the communication device, presence of the jamming signal when the second quantitative measure satisfies the at least the second jamming signal detection threshold.

2. The method of claim 1, wherein the communication device is configured to communicate, within the first frequency range, a signal having a first bandwidth, and wherein the jamming signal has a second bandwidth that is greater than the first bandwidth.

3. The method of claim 1, wherein the first quantitative measure comprises a ratio of a total number of scanned channels having energy that exceeds the energy threshold to a total number of scanned channels.

4. The method of claim 1, wherein the first quantitative measure comprises a highest number of consecutive scanned channels having energy that exceeds the energy threshold.

5. The method of claim 1, wherein the first quantitative measure comprises a combination of average energy and standard deviation of energy detected across all scanned channels.

6. The method of claim 1 further comprising indicating, to an external device, the presence of the jamming signal and a geographic position of the communication device when the first quantitative measure satisfies the at least the first jamming signal detection threshold.

7. The method of claim 6, wherein indicating the absence of the jamming signal to the external device is performed after the jamming signal is no longer detected.

8. The method of claim 6, wherein the jamming signal is present on a first set of channels within the first frequency range, and the presence of the jamming signal is indicated to the external device using a second set of channels that is different than the first set of channels.

9. The method of claim 1, wherein the presence of the jamming signal is indicated on the communication device using at least one of color, sound, or graphics.

10. The method of claim 1, wherein the scanned channels comprise at least one unassigned channel.

11. The method of claim 1, wherein retrieving the scan list is performed in response to a loss of radio communication service to the communication device.

12. The method of claim 11, wherein retrieving the scan list is automatically triggered upon the loss of radio communication service to the communication device.

13. The method of claim 1, wherein retrieving the scan list is triggered by user input into a user interface of the communication device.

14. The method of claim 1 furthering comprising:
when the second quantitative measure fails to satisfy the at least the second jamming signal detection threshold, comparing a third quantitative measure to at least a third jamming signal detection threshold, wherein the third quantitative measure is determined based on a third plurality of the scanned subset of the channels having energy that exceeds the energy threshold; and
indicating, on the communication device, presence of the jamming signal when the third quantitative measure satisfies the at least the third jamming signal detection threshold.

15. The method of claim 14, wherein:
the first quantitative measure comprises a ratio of a total number of scanned channels having signal strength that exceeds a signal strength threshold to a total number of scanned channels;
the second quantitative measure comprises a highest number of consecutive scanned channels having signal strength that exceeds the signal strength threshold; and
the third quantitative measure comprises a combination of average signal strength and standard deviation of signal strength detected across all scanned channels.

16. A communication device for detecting, within a first frequency range of operation of the communication device, presence of a jamming signal having a first bandwidth, the communication device comprising:
a network interface configured to:
communicate, within the first frequency range, at least one signal having a second bandwidth that is less than the first bandwidth;
retrieve a scan list comprising multiple radio channels within the first frequency range; and
scan at least a subset of the radio channels on the scan list to detect signal strength on each scanned radio channel;
a processing device coupled to the network interface and configured to:
compare each detected signal strength to a signal strength threshold to determine all scanned channels having a detected signal strength that exceeds the signal strength threshold;
derive a first one of multiple quantitative measures of a first plurality of the scanned the at least the subset of the radio channels having a detected signal strength that exceeds the signal strength threshold;
compare the first one of the derived multiple quantitative measures to a first jamming signal detection threshold to determine presence of the jamming signal within the first frequency range;
when the first one of the derived multiple quantitative measures fails to satisfy the first jamming signal detection threshold, compare a second one of the derived multiple quantitative measures to a second jamming signal detection threshold, wherein the second one of the derived multiple quantitative measures is determined based on a second plurality of the scanned the at least the subset of the radio channels having a detected signal strength that exceeds the signal strength threshold; and
a user interface coupled to the processing device and configured to provide an indication of the presence of the jamming signal when the first one of the derived multiple quantitative measures satisfies the first jamming signal detection threshold, and when the second one of the derived multiple quantitative measures satisfies the second jamming signal detection threshold, wherein the user interface is configured to provide the indication of the presence of the jamming signal using at least one of color, sound, or a graph.

17. The communication device of claim 16 further comprising a location device coupled to the network interface and configured to determine a location of the communication device when the first one of the derived multiple quantitative measures satisfies the first jamming signal detection threshold, wherein the communication device is configured to provide, to a second device using the network interface, the indication of the presence of the jamming signal and the location of the communication device.

18. The communication device of claim 16, wherein the multiple quantitative measures comprises at least two of: a ratio of a total number of scanned channels having signal strength that exceeds the signal strength threshold to a total number of scanned channels; a highest number of consecutive scanned channels having signal strength that exceeds the signal strength threshold; or a combination of average signal strength and standard deviation of signal strength detected across all scanned channels.

19. A non-transient computer-readable storage element having computer readable code stored thereon for programming a computer to perform a method for detecting presence of a jamming signal, the method comprising:
  retrieving a scan list of channels within a frequency band of operation of the communication device, wherein the retrieving is performed in response to a loss of radio communication service to the communication device;
  scanning multiple channels on the scan list to determine scanning results indicating, for each scanned channel, whether energy that exceeds an energy threshold is detected on the channel;
  determining, based on the scanning results, a ratio of a total number of scanned channels having energy that exceeds the energy threshold to a total number of scanned channels and a highest number of consecutive scanned channels having energy that exceeds the energy threshold;
  determining presence of a jamming signal when the ratio exceeds a confidence threshold;
  otherwise determining presence of the jamming signal when the highest number of consecutive scanned channels having energy that exceeds the energy threshold exceeds a threshold detection count;
  otherwise, determining, based on the scanning results, a combination of average energy and standard deviation of energy detected across all scanned channels, and determining presence of the jamming signal when the average energy exceeds an average energy threshold and the standard deviation is below a standard deviation.

20. A communication device for detecting, within a first frequency range of operation of the communication device, presence of a jamming signal having a first bandwidth, the communication device comprising:
  a network interface configured to:
    communicate, within the first frequency range, at least one signal having a second bandwidth that is less than the first bandwidth;
    retrieve a scan list comprising multiple radio channels within the first frequency range; and
    scan at least a subset of the radio channels on the scan list to detect signal strength on each scanned radio channel;
  a processing device coupled to the network interface and configured to:
    compare each detected signal strength to a signal strength threshold to determine all scanned channels having a detected signal strength that exceeds the signal strength threshold;
    derive at least one of multiple quantitative measures of a plurality of the scanned the at least the subset of the radio channels having a detected signal strength that exceeds the signal strength threshold; and
    compare each derived quantitative measure to a corresponding jamming signal detection threshold to determine presence of the jamming signal within the first frequency range;
  a location device coupled to the network interface and configured to determine a location of the communication device when the at least one of the derived quantitative measures satisfies the corresponding jamming signal detection threshold, wherein the communication device is configured to provide, to a second device using the network interface, the indication of the presence of the jamming signal and the location of the communication device; and
  a user interface coupled to the processing device and configured to provide an indication of the presence of the jamming signal when at least one of the derived quantitative measures satisfies the corresponding jamming signal detection threshold, wherein the user interface is configured to provide the indication of the presence of the jamming signal using at least one of color, sound, or a graph.

21. A communication device for detecting, within a first frequency range of operation of the communication device, presence of a jamming signal having a first bandwidth, the communication device comprising:
  a network interface configured to:
    communicate, within the first frequency range, at least one signal having a second bandwidth that is less than the first bandwidth;
    retrieve a scan list comprising multiple radio channels within the first frequency range; and
    scan at least a subset of the radio channels on the scan list to detect signal strength on each scanned radio channel;
  a processing device coupled to the network interface and configured to:
    compare each detected signal strength to a signal strength threshold to determine all scanned channels having a detected signal strength that exceeds the signal strength threshold;
    derive at least one of multiple quantitative measures of a plurality of the scanned the at least the subset of the radio channels having a detected signal strength that exceeds the signal strength threshold;
    compare each derived quantitative measure to a corresponding jamming signal detection threshold to determine presence of the jamming signal within the first frequency range; and
    wherein the multiple quantitative measures comprises at least two of: a ratio of a total number of scanned channels having signal strength that exceeds the signal strength threshold to a total number of scanned channels; a highest number of consecutive scanned channels having signal strength that exceeds the signal strength threshold; or a combination of average signal strength and standard deviation of signal strength detected across all scanned channels; and
  a user interface coupled to the processing device and configured to provide an indication of the presence of the jamming signal when at least one of the derived quantitative measures satisfies the corresponding jamming signal detection threshold, wherein the user interface is configured to provide the indication of the presence of the jamming signal using at least one of color, sound, or a graph.

* * * * *